Figure 1:
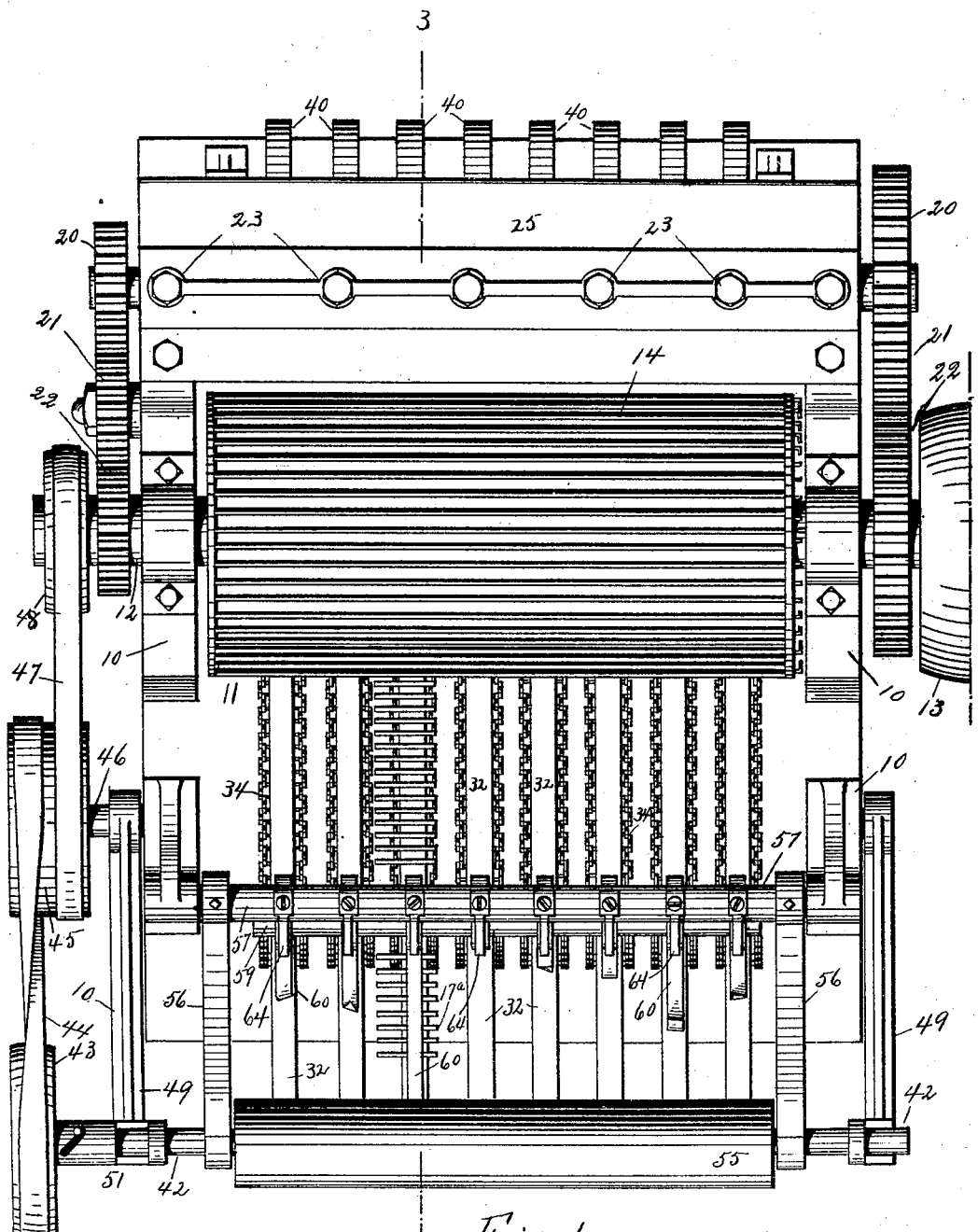

No. 773,394. PATENTED OCT. 25, 1904.
D. HUTCHINSON & M. T. WESTON.
MACHINE FOR CUTTING AND ASSEMBLING MATCH SPLINTS.
APPLICATION FILED JUNE 13, 1896. RENEWED DEC. 31, 1897.
NO MODEL. 4 SHEETS—SHEET 1.

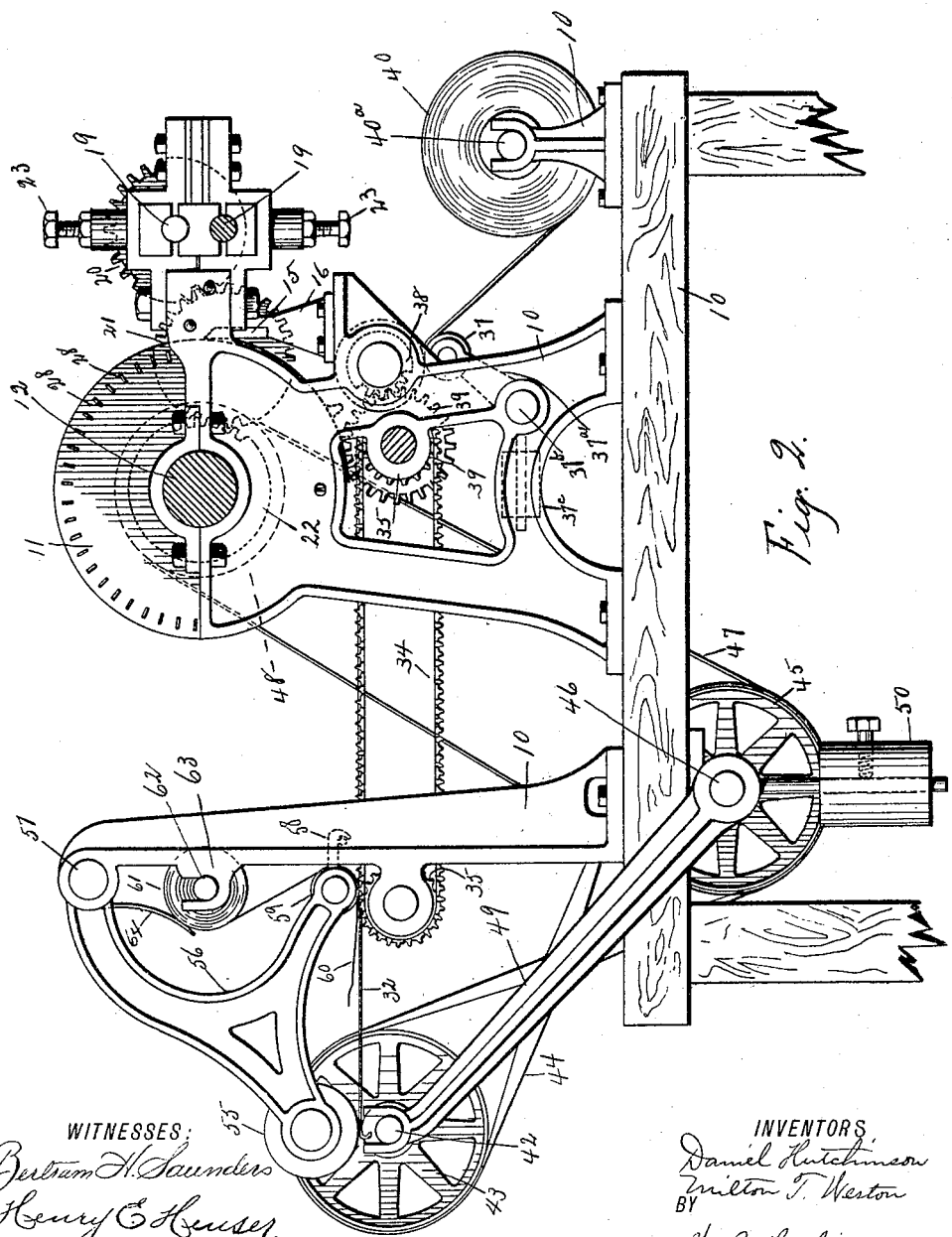

No. 773,394. PATENTED OCT. 25, 1904.
D. HUTCHINSON & M. T. WESTON.
MACHINE FOR CUTTING AND ASSEMBLING MATCH SPLINTS.
APPLICATION FILED JUNE 13, 1896. RENEWED DEC. 31, 1897.
NO MODEL. 4 SHEETS—SHEET 3.
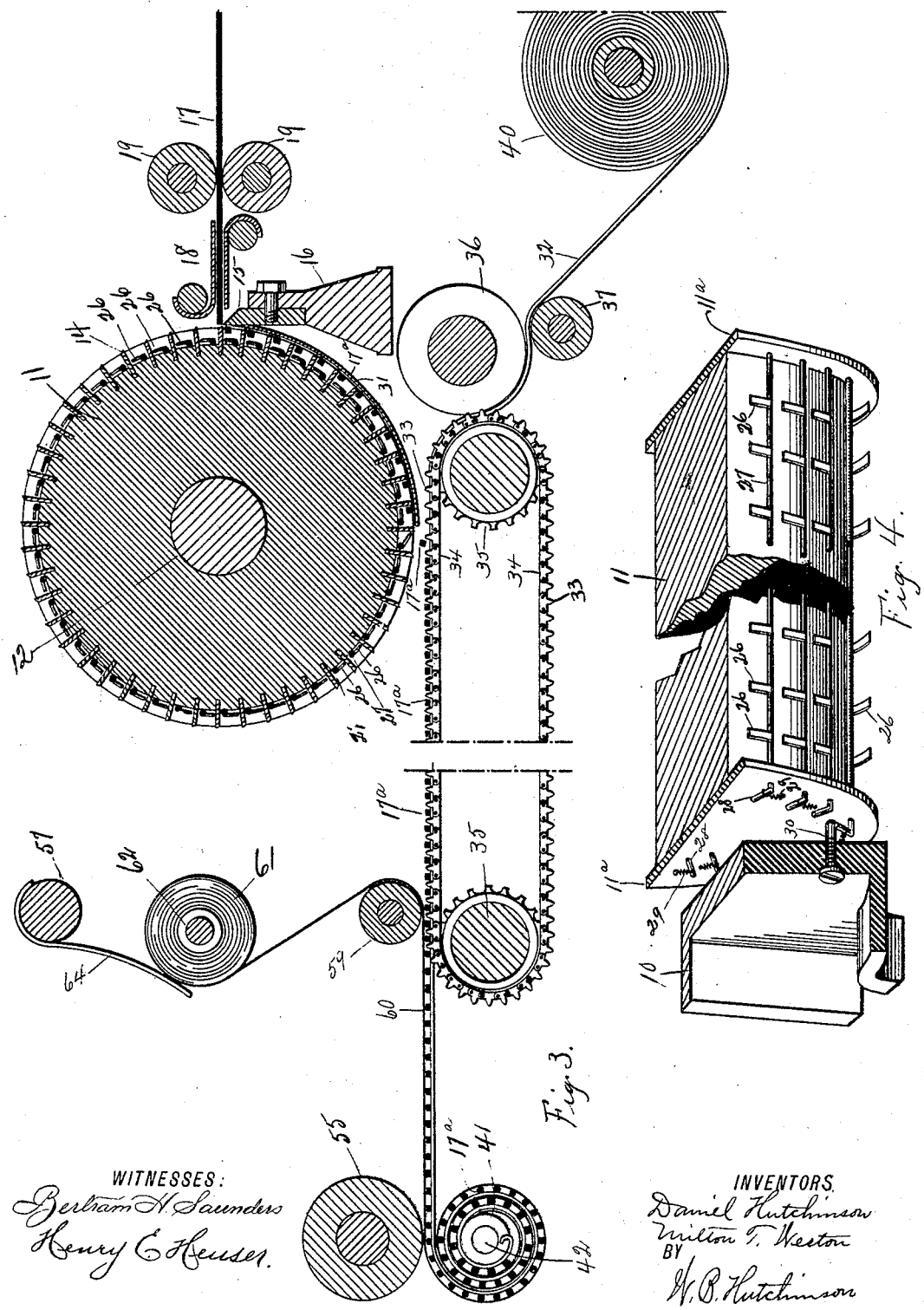
WITNESSES:
Bertram H. Saunders
Henry E. Heuser
INVENTORS.
Daniel Hutchinson
Milton T. Weston
BY
W. B. Hutchinson
ATTORNEY.

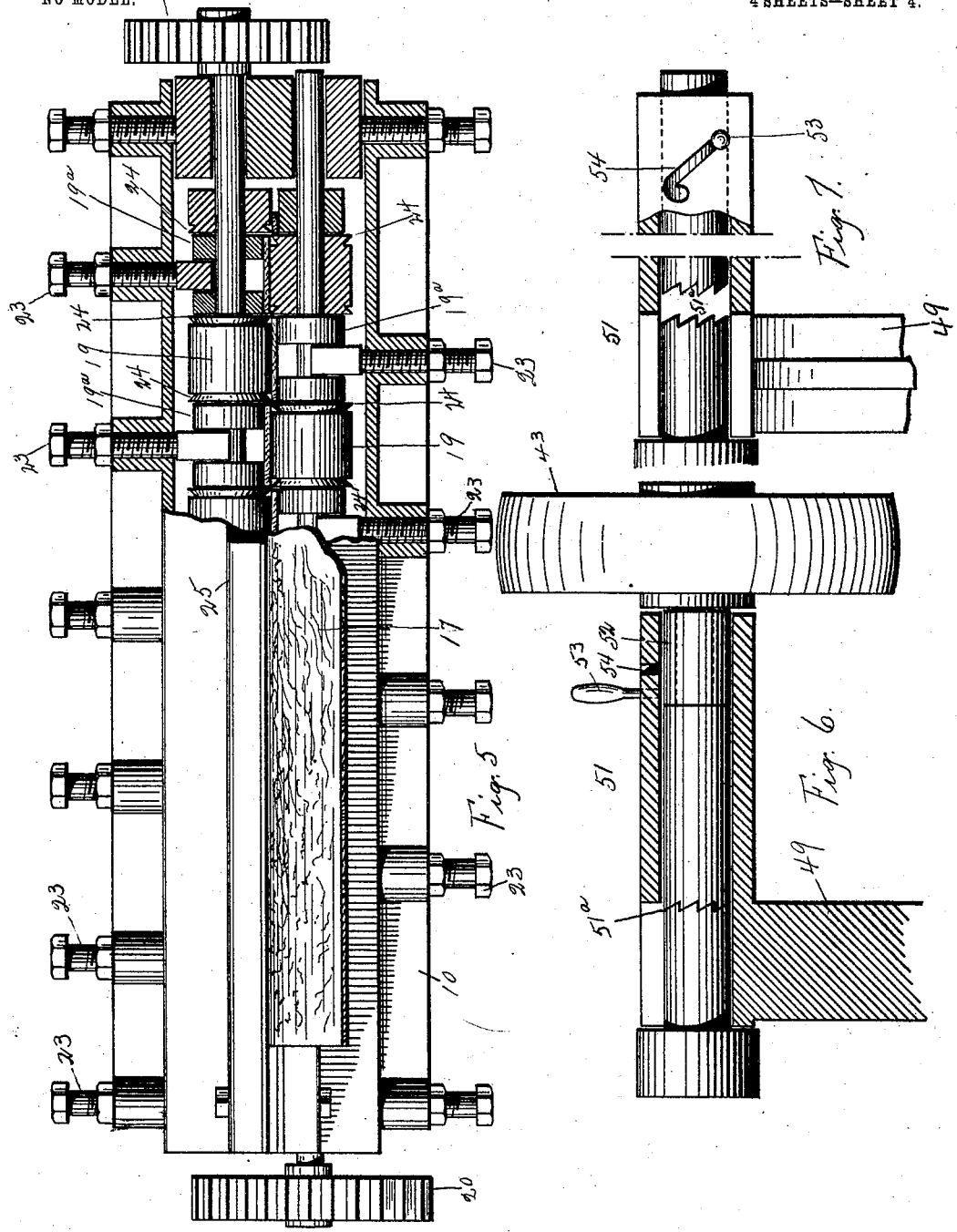

No. 773,394. Patented October 25, 1904.

UNITED STATES PATENT OFFICE.

DANIEL HUTCHINSON, OF PASSAIC, NEW JERSEY, AND MILTON T. WESTON, OF NEW YORK, N. Y., ASSIGNORS TO THE DIAMOND MATCH COMPANY, OF CHICAGO, ILLINOIS, A CORPORATION OF ILLINOIS.

MACHINE FOR CUTTING AND ASSEMBLING MATCH-SPLINTS.

SPECIFICATION forming part of Letters Patent No. 773,394, dated October 25, 1904.

Application filed June 13, 1896. Renewed December 31, 1897. Serial No. 665,258. (No model.)

*To all whom it may concern:*

Be it known that we, DANIEL HUTCHINSON, of Passaic, in the county of Passaic and State of New Jersey, and MILTON T. WESTON, of New York, in the county of New York and State of New York, have invented certain new and useful Improvements in Machines for Cutting and Assembling Match-Splints, of which the following is a full, clear, and exact description.

Our invention relates to improvements in splint cutting and assembling machines; and the object of our invention is to improve this style of machinery and produce a machine which is comparatively simple in structure and which will receive a long sheet of veneer, split the sheet into strips the width of which corresponds to the length of a match-splint, cut the several strips into match-splints, and finally coil or assemble the splints in a series of coils in condition to be dipped in the several compositions usual to match-making processes.

To these ends our invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a plan view of the machine embodying our invention. Fig. 2 is broken side elevation of the machine. Fig. 3 is a diagrammatic section on the line 3 3 of Fig. 1, the view showing the working parts, but with the frame and subordinate pieces left out. Fig. 4 is a broken detail sectional view illustrating the mechanism for working the ejectors which discharge the severed splints from between the knives of the cutter-head. Fig. 5 is a detail front elevation, partly in cross-section, showing the manner in which the veneer is fed to the machine and the mechanism for feeding the veneer and splitting it into strips. Fig. 6 is a detail longitudinal section of the clutch used in starting and stopping the coiling mechanism of the machine; and Fig. 7 is a broken plan view, partly in section, of the said clutch.

The machine has a suitable frame 10, which, as illustrated, is made up of a number of separable parts; but they are all designated by the one numeral 10, as they may be made in one part, if preferred. Journaled on the machine is a cutter-head 11, which is carried by a shaft 12, this, as illustrated, being driven by a pulley 13, although other means may be used for driving it. The cutter-head has radial knives 14, which travel in close proximity to the cutting edge of the stationary knife 15. (See Fig. 3.) Each knife 15 is fastened to a cutter-bar 16, supported on the main frame.

The veneer 17 is fed through a guide 18 and between guide-rolls 19 and presses against the cutter-head between the knives 14, which carry it downward against the edge of the knife 15, and so every time a knife 14 passes the knife 15 a splint is cut, as shown clearly in Fig. 3. This is an old method of cutting and needs no further description.

The rolls 19 are timed so as to feed the veneer at the right speed, and, as illustrated, they are driven by the gears 20, 21, and 22, (see Fig. 1,) which connect the shafts of the feed-rolls with the main shaft 12. Alternating rolls above and below the meeting-point are split, as shown at $19^a$, to provide for the adjusting-screws 23, which are arranged above and below the upper and lower feed-rolls to enable them to be properly adjusted in a common and well-known manner by their tension on the shafts of the feed-rolls, and the ends of the rolls 19 are formed into circular knives 24, the edges of which are in slightly different planes and are adapted to overlap a very little when the veneer is pressed between the feed-rolls, so that when a sheet 17 is fed into the machine it will be cut into a series of strips, the width of each strip corresponding to the length of the roll 19 and also to the length of a match-splint. The feed-rolls 19 $19^a$ and knives 24 are preferably covered by a hood 25, (see Figs. 1 and 5,) which serves as a guard and also guides the veneer 17.

Between each pair of knives 14 are ejectors comprising the lips 26 and rods 27, the rods extending longitudinally across the cutter-head or drum 11 and the lips being placed at right angles to the rods, so that as the splints $17^a$ are cut from the veneer they will lie opposite the lips. The rods project through flanges $11^a$ at the ends of the cutter-head 11 and terminate in cranks 28, which are held by springs 29 so as to normally press the lips 26 against the face of the cutter-head; but at a certain point, which, as illustrated, is opposite the lower side of the cutter-head, the cranks touch the fixed abutment 30, which is fastened to the frame 10 and which tilts the cranks 28 and lips 26 so that the latter throw outward and eject the splints $17^a$. This tilting takes place, as shown in Fig. 3, at the lower edge of a guide 31, which extends from the knife 15 to a point beneath the cutter-head, and the splints are pushed along on this guide by the knives 14. It will be seen that the ejectors not only throw out each series of splints, but that they lie upon the splints after they are cut and prevent the splints from jumping out of place.

As the splints are ejected they lie upon belts 32, there being a belt beneath each row of splints, and the splints are held the right distance apart and prevented from twisting by the projections 33 on the chains 34, the chains traveling horizontally beneath the cutter-head and being arranged parallel with each other and running on sprocket-wheels 35. Each belt 32 is guided to its place on the chain 34 by the guide and feed rolls 36 and 37, the latter being pressed to place and serving as a belt-tightener, as it is journaled in arms $37^a$, (see Fig. 2,) which are secured to a shaft $37^b$, which is journaled on the frame 10 and is counterbalanced by the weight $37^c$. The roll 36 is driven by gears 38 and 39, connecting with the shaft of one of the sprocket-wheels 35, and these may be driven in any convenient way, although it has not been thought necessary to show any gearing for driving them, as the driving mechanism forms no part of the invention.

The several belts 32 are drawn from coils 40, which are carried on a shaft $40^a$, journaled detachably on the main frame 10, and as the belts are unwound from the coils 40 they are wound into coils 41, (see Fig. 3,) which are wound on the shaft 42 in the usual manner. The shaft 42 is driven by a pulley 43, which is turned by a belt 44, connecting with a pulley 45 on the shaft 46, and the latter shaft is driven by a belt 47, also connecting with the pulley 45 and with a pulley 48 on the main shaft 12. The shaft 42 is journaled on arms 49, which are counterbalanced by the weights 50 and are hung on the shaft 46. This provides for the increasing size of the coils 41, and the coil as it grows larger depresses the arms 49 against the tension of the weight 50, this being caused by the pressure of the coil on the presser-roll 55 above. The shaft 40 needs to be started and stopped with the beginning and ending of a coil or coils 41, and to this end it is provided with a clutch 51, (see Figs. 1, 6, and 7,) which is of the usual kind, but which will be briefly described to make the drawings plain. The two parts of the shaft 42 are provided with meeting teeth $51^a$, and the movable part, which has the driving-pulley 43, is provided with a loose collar 52, which is moved by the handle 53, working in the cam-slot 54 of the bearing of the shaft, and thus by moving the handle the shaft may be thrown in or out of gear in the usual way.

The presser-roll 55, above the shaft 42, is hung in a swinging frame 56, which can be turned up out of the way when the shaft 42 is to be removed, and this frame 56 is hung on a rod 57 and at its lower edge is fastened by a hook 58 or equivalent fastening.

At the lower edge of the frame and next the frame 10 is a roll 59, which is directly above the rear ends of the chains 34, (see Fig. 3,) and this roll serves as a tension-roll for the tapes 60, which are unwound from coils 61 on the shaft 62 and are fed beneath the tension-rolls 59 and which are coiled up on the coils 41, the tapes lying over the match-splints $17^a$, so as to bind the latter in place, this arrangement being common to splint-coiling machines. The shaft 62 is hung detachably on the frame 10, and the tension of the coils 61 is further preserved by the springs 64, which are secured to the rods 57 and press against the coils 61.

It will be observed that when a sheet of veneer 17 is fed to the machine and the belts 32 and tapes 60 adjusted and the shaft 42 started that the sheet will be divided by the knives 24 into a series of strips, which will be cut by the knives 14 and 15 into a series of splints $17^a$, which will be delivered by the ejectors upon the belts 32 and wound into coils 41 in the manner just described, so that by a comparatively simple process a broad sheet of veneer is automatically cut into splints and the latter are assembled into coils ready to be dipped.

We are aware that it is not new to cut match-splints from a block or from veneer and assemble the splints in a coil or package by the same machine, also that it is not new to assemble the splints in coils or packages and then sever the assembled splints; but we are not aware that a machine has ever been used to cut and deliver a multiple series of match-splints to independent coiling devices whereby a relatively large number of coils are simultaneously produced, and it is this feature which forms the gist of our invention and which we broadly claim.

Having thus described our invention, we claim as new and desire to secure by Letters Patent—

1. The combination of a cutter-head having parallel longitudinal knives and ejectors extending lengthwise of and between the knives, each ejector tilting on an axis parallel to the axis of the cutter-head, whereby rows of splints are cut by and discharged from said head, and means to receive and carry off said splints, substantially as described.

2. The combination of a cutter-head having parallel longitudinal knives and ejectors extending lengthwise of and between the knives, each ejector tilting on an axis parallel to the axis of the cutter-head whereby rows of splints are cut by and discharged from said head, and a series of independent belts adapted to receive and carry off said splints, substantially as described.

3. The combination of a cutter-head having parallel longitudinal knives and ejectors extending lengthwise of and between the knives, each ejector tilting on an axis parallel to the axis of the cutter-head whereby rows of splints are cut by and discharged from said head, and a series of independent belts adapted to receive and carry off said splints, together with means for rolling said belts into coils, substantially as described.

4. The combination of a cutter-head having parallel longitudinal knives of a length to cut a row of splints from sheet material and having also ejectors extending lengthwise of and between the knives, each ejector tilting on an axis parallel to the axis of the cutter-head, cutters for severing the stock into splint lengths before it reaches said knives, and means to receive and carry off said splints, substantially as described.

5. The combination of a cutter-head having a series of parallel longitudinal knives of a length to cut a row of splints from sheet material and having also ejectors extending lengthwise of and between the knives, each ejector tilting on an axis parallel to the axis of the cutter-head, cutters for severing the stock into splint lengths before it reaches said knives, a series of belts to which splints cut by the knives are delivered, adapted each to receive splints crosswise of the same, and guiding devices to hold the splints on their respective belts, substantially as described.

6. The combination of a cutter-head having a series of parallel longitudinal knives of a length to cut a row of splints from sheet material and having also ejectors extending lengthwise of and between the knives, each ejector tilting on an axis parallel to the axis of the cutter-head, cutters for severing the stock into splint lengths before it reaches said knives, a series of belts to which splints cut by the knives are delivered, adapted each to receive splints crosswise of the same, and guiding devices to hold the splints on their respective belts, together with means for rolling the said belts into coils, substantially as described.

7. The combination of a cutter-head having parallel longitudinal knives and ejectors extending lengthwise of the cutter-head between the knives, each ejector tilting on an axis parallel to the axis of the cutter-head, substantially as described.

8. The combination with a cutter-head having radial knives longitudinally thereof, of the ejectors extending longitudinally between the knives and arranged to eject the several series of splints from the cutter-head, each ejector tilting on an axis parallel to the axis of the cutter-head, substantially as described.

9. The combination with a cutter-head having radial longitudinal knives, of the ejectors hung on longitudinal pivots between the knives and adapted to throw out the several series of splints, and means, as the cranks of the ejectors and the abutment opposite the cranks, to tilt the ejectors, substantially as described.

DANIEL HUTCHINSON.
MILTON T. WESTON.

Witnesses:
W. B. HUTCHINSON,
BERTHA DEYO.